United States Patent [19]
Lubbersmeyer

[11] 3,950,046
[45] Apr. 13, 1976

[54] BEARING PLATE

[75] Inventor: Karl Lubbersmeyer, Herzogenaurach, Germany

[73] Assignee: Industriewerk Schaeffler OHG, Herzogenaurach, Germany

[22] Filed: Aug. 7, 1974

[21] Appl. No.: 495,304

[30] Foreign Application Priority Data
Aug. 30, 1973 Germany............................ 2343748
Mar. 5, 1974 Germany............................ 2410381

[52] U.S. Cl. .......................... 308/190; 74/242.15 R
[51] Int. Cl.² ........................................ F16C 33/00
[58] Field of Search............ 74/242.15 R, 242.1 TA, 74/242.8, 230.1; 308/188, 190, 191, 18

[56] References Cited
UNITED STATES PATENTS
1,153,372   9/1915   Churchward................ 74/242.15 R
3,464,282   9/1969   Grobowski................... 74/242.15 R
3,623,378   11/1971  Stanford....................... 74/242.15 R
3,811,333   5/1974   Castarede..................... 74/242.15 R
3,833,278   9/1974   Green ................................. 308/190

Primary Examiner—M. H. Wood, Jr.
Assistant Examiner—Richard A. Bertsch
Attorney, Agent, or Firm—Hammond & Littell

[57] ABSTRACT

A novel thin-walled bearing plate for the pivotal support of a tension roller secured thereon comprising a sheet metal bearing plate provided with a bore hole to accommodate a fastening bolt and an oblong slot to accommodate a locking bolt and also provided with an integral hollow-cylindrical protruberance on which the tension roller is to be mounted.

3 Claims, 5 Drawing Figures

BEARING PLATE

STATE OF THE ART

Units comprised of a bearing plate and a tension roller mounted thereon are known and are used to tighten V-belts or toothed belts for motor vehicles engines, for example. The bearing plates are provided with a bore for pivotal movement about a bolt and with a circular oblong slot for accommodating a locking screw. The bearing plate is preferably under the action of a tension spring which urges the tension roller mounted on the bearing plate with a predetermined force against the belt to be tightened after which the bearing plate is locked in position with the locking screw.

These known bearing plates were made out of a relatively thick metal disc provided with the necessary bore and slot and the tension roller was secured thereto with a bolt mounted in a bore of the bearing plate. Another bolt and cooperating bore were required to secure the tension spring to the bearing plate.

OBJECTS OF THE INVENTION

It is an object of the invention to provide a simpler and more economical bearing plate.

It is a further object of the invention to provide a novel bearing plate for support of tension rollers having a minimum number of parts.

These and other objects and advantages of the invention will become obvious from the following detailed description.

THE INVENTION

The problems of the prior art have now been solved by the invention in which the bearing plate is made of sheet metal and is provided with a hollow-cylindrical protruberance integral with the bearing plate for supporting the tension roller.

The novel bearing plate of the invention is comprised of a sheet metal bearing plate provided with a bore hole to accommodate a fastening bolt and an oblong slot to accommodate a locking bolt and also provided with an integral hollow-cylindrical protruberance on which the tension roller is to be mounted.

The tension roller may be mounted on a roller bearing consisting of an inner race, an outer race forming the roller proper and rollers rolling therebetween. The inner race may be simply secured onto the hollow-cylindrical protruberance of the bearing plate by press fitting the inner race on the said protruberance. Additional securing may be provided by knurling to the outside the said protruberance at its end away from the bearing plate to hold the inner race in place.

In another embodiment of the invention, the hollow-cylindrical protruberance is provided with a circumferential groove in which a roll of balls roll to carry the outer race forming the roller proper. This simple construction has the advantage that the inner race required by previous constructions may be eliminated.

In another embodiment, the hollow-cylindrical protruberance may be stiffened by providing the said protruberance with a closed bottom at its end farthest from the bearing plate. It is, also, possible to provide a substantially U-shaped cut in the bearing plate and bend the resulting lug to a right angle to the bearing plate surface to provide in a simple manner without additional parts an anchoring means for the tension spring acting on the bearing plate.

Referring now to the drawings.

Figure 1:
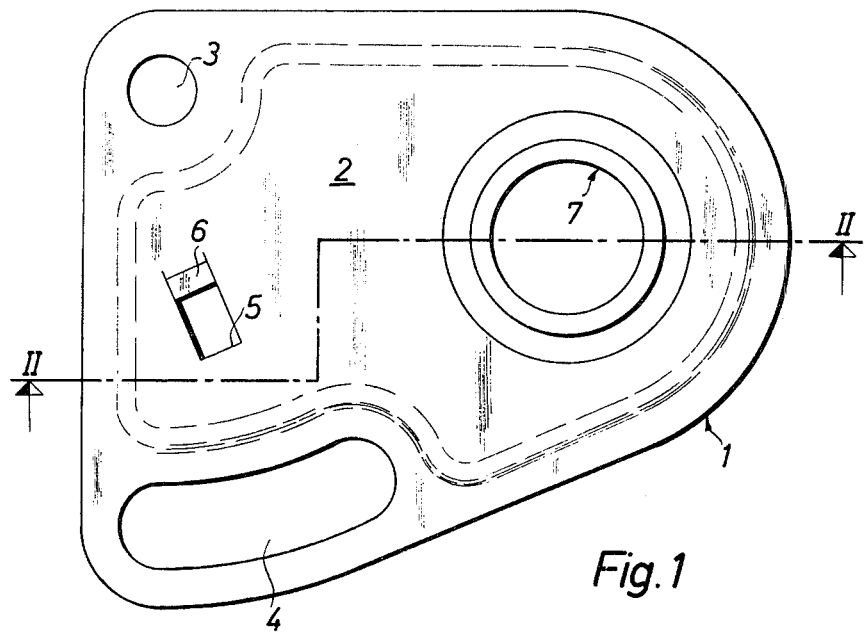
FIG. 1 is a plane view of a bearing plate of the invention.
Figure 2:
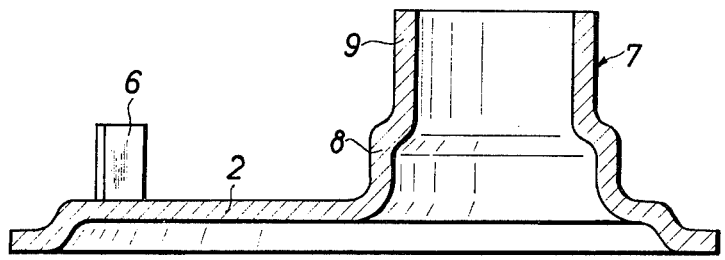
FIG. 2 is a cross-sectional view of the bearing plate of FIG. 1 taken along the line II—II.

In FIGS. 1 and 2, the bearing plate 1 is substantially planar but has a dish-shaped elevation 2 in its central region for strengthening and is provided with a bore hole 3 to accommodate a fastening bolt (not shown) about which the bearing plate may be swiveled and a circular oblong slot 4 to accommodate a locking screw (not shown). Moreover, the bearing plate 1 is provided with a substantially U-shaped cut 5 and the resulting lug 6 is bent at a right angle to the plate surface to act as a point of attachment for a tension spring. An essential element of the invention is a hollow-cylindrical protruberance 7 integral with bearing plate 1 having a larger diameter area 8 in the area adjacent the plate surface and an area 9 of a smaller diameter adjacent thereto.

Figure 3:
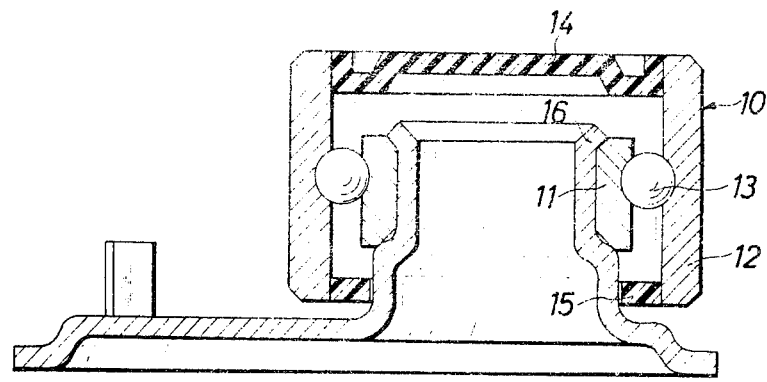
FIG. 3 is a cross-sectional view of the embodiment of 2 with the tension roller secured to the bearing plate.

In FIG. 3, a tension roller 10 is mounted on the bearing plate 1 and consists of inner race 11, outer race 12 forming the tension roller proper and a roll of balls 13 rolling on the said races. At the outer end of the roller, a cover 14 is inserted in race 12 and at the inner end of the roller, a ring 15 is inserted in race 12 which cooperates with large diameter area 8 of hollow-cylindrical protruberance 7 to form a seal. The inner race 11 of the tension roller of FIG. 3 is secured to the hollow-cylindrical protruberance 7 by a knural 16 at the top of protruberance 7.

Figure 4:
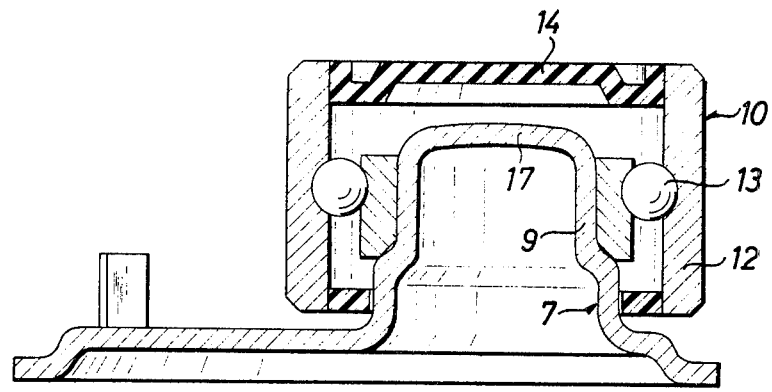
FIG. 4 is a cross-sectional view of another embodiment of a bearing plate of the invention and FIG. 5 is a cross-sectional view of another embodiment of the bearing plate of the invention in which ball bearings roll in a groove therein.

The embodiment of FIG. 4 is similar to that of FIG. 3 except that the inner race 11 is secured to hollow-cylindrical protruberance 7 in smaller diameter area 9 merely by a press fit. To provide a substantial stiffening of the hollow-cylindrical protruberance 7, the end remote from bearing plate 1 is provided with a closed bottom 17.

Figure 5:
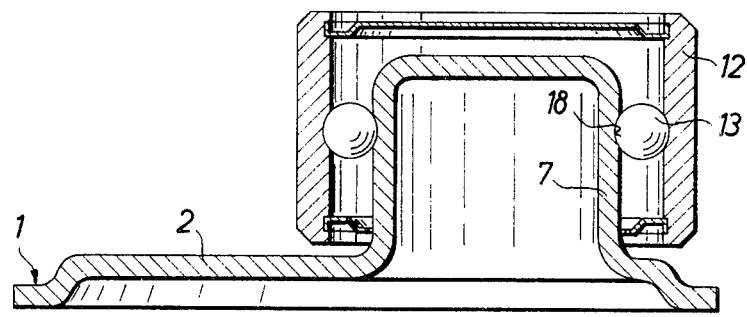

In the embodiment of FIG. 5, the inner race of the roller bearing is completely eliminated and instead the hollow-cylindrical protruberance 7 with a closed bottom is provided a circumferential groove 18 in which the balls 13 roll. The said groove 18 may be effected by non-cutting shaping such as by rolling which if necessary, may be followed by precision cutting machining such as grinding. Moreover, the protruberance 7 in this Fig. has a single diameter as the race has been omitted and the shoulder formed between the larger diameter area 8 and smaller diameter area 9 is not required.

Various modifications of the bearing plate of the invention may be made without departing from the spirit or scope thereof and it is to be understood that the invention is intended to be limited only as defined in the appended claims.

I claim:

1. A bearing plate for the pivotal support of a tension roller secured thereto comprising a sheet metal bearing plate provided with a bore hole to accommodate a fastening bolt and an oblong slot to accommodate a locking bolt and also provided with an integral hollow-cylindrical protuberance on which the tension roller is to be mounted, a tension roller mounted thereon by a roller bearing consisting of an inner race secured on the hollow-cylindrical protuberance of the plate, an outer race forming the roller proper and rollers rolling on said races, the said plate being provided with a substantially U-shaped cut and the resulting lug is bent at a right angle to the bearing plate to form an anchor for a tension spring.

2. A bearing plate for the pivotal support of a tension roller secured thereto comprising a sheet metal bearing plate provided with a bore hole to accommodate a fastening bolt and an oblong slot to accommodate a locking bolt and also provided with an integral hollow-cylindrical protuberance on which the tension roller is to be mounted, a circumferential grove being provided in the hollow-cylindrical protuberance and a tension roller mounted on the said protuberance forming the outer race and a row of balls in said groove.

3. A bearing plate for the pivotal support of a tension roller secured thereto comprising a sheet metal bearing plate provided with a bore hole to accommodate a fastening bolt and an oblong slot to accommodate a locking bolt and also provided with an integral hollow-cylindrical protuberance on which the tension roller is to be mounted, the end of the protuberance farthest from the bearing plate having a closed bottom.

* * * * *